Dec. 15, 1970  R. H. GRANT  3,547,532
APPARATUS FOR FORMING HOLOGRAMS
Filed March 7, 1968  3 Sheets-Sheet 1

INVENTOR
ROBERT H. GRANT

BY Hauke, Krass, Gifford, & Patalidis

ATTORNEYS

Dec. 15, 1970  R. H. GRANT  3,547,532
APPARATUS FOR FORMING HOLOGRAMS
Filed March 7, 1968  3 Sheets-Sheet 2
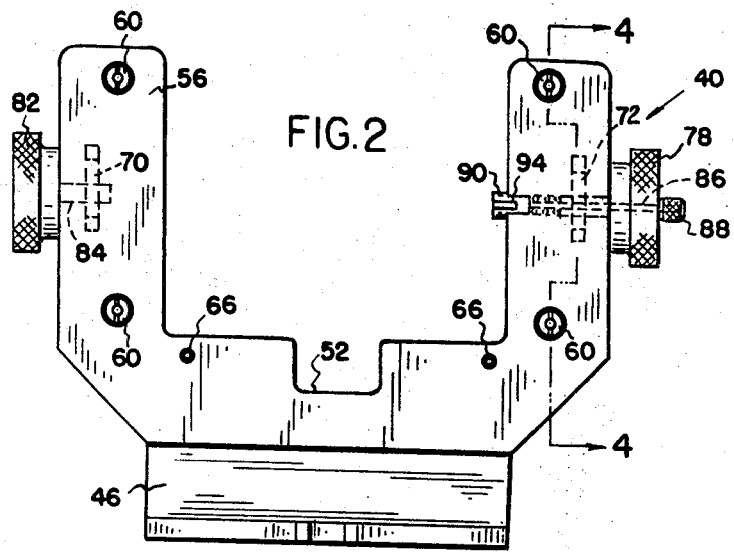
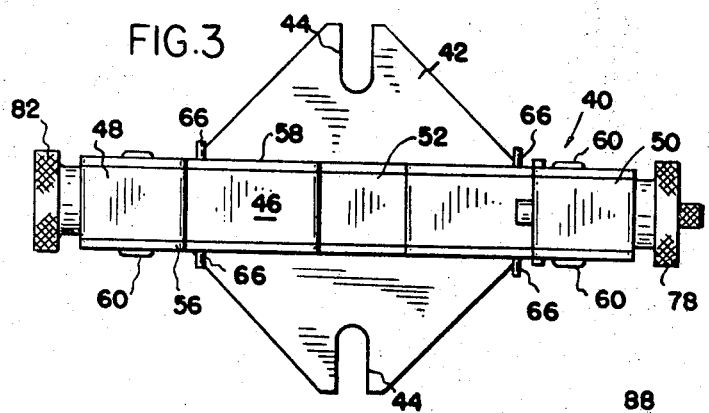
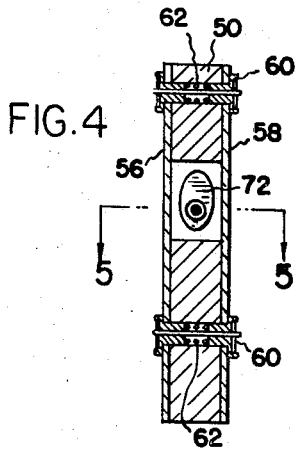
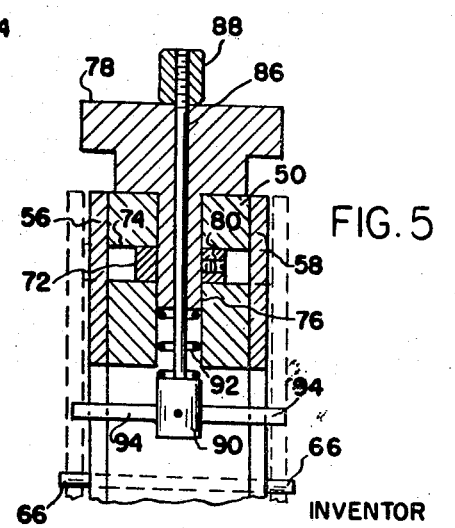
INVENTOR
ROBERT H. GRANT
BY Hauke, Kruss, Gifford, & Patalidis
ATTORNEYS Dec. 15, 1970 R. H. GRANT 3,547,532
APPARATUS FOR FORMING HOLOGRAMS
Filed March 7, 1968 3 Sheets-Sheet 3

INVENTOR
ROBERT H. GRANT

BY Hauke, Krass, Gifford, & Patalidi

ATTORNEYS

United States Patent Office 3,547,532
Patented Dec. 15, 1970

3,547,532
APPARATUS FOR FORMING HOLOGRAMS
Robert H. Grant, Utica, Mich., assignor to G. C. Optronics, Inc., Ann Arbor, Mich., a corporation of Michigan
Filed Mar. 7, 1968, Ser. No. 711,394
Int. Cl. G03b 27/58, 27/62
U.S. Cl. 355—2                          7 Claims

ABSTRACT OF THE DISCLOSURE

To form a double exposure hologram of a member undergoing dimensional changes, which hologram contains fringe lines arrayed in a pattern which is a function of the displacement of the member from a steady state, a hologram of the member in the steady state is first made. This primary hologram is supported adjacent to the member in a frame which allows translation toward and away from the member and rotation about an axis which is perpendicular to the axes of translation. The frame is adjusted so that the visual image of the object as viewed through the hologram coincides with the object in its steady state. The object is then viewed through the hologram as it undergoes a variation in dimension and final holograms of interesting conditions are made by positioning a photographic plate within the frame so as to receive illumination directly from the object illuminating coherent source and coherent light reflected from the object. The object is then returned to its original dimensions and a second exposure is made on the same plate. Alternatively, the object may be vibrated while being viewed through the hologram and interesting conditions can be recorded by photographing the member, using the time averaging property of the film to record two states.

BACKGROUND OF THE INVENTION

Field of the invention

This invention relates to apparatus for forming holograms of an object involving exposures at at least two closely related dimensional states of the object, whereby the visual reconstruction of the object, as viewed through the developed hologram, reveals fringe families arranged in a pattern which is a function of the displacement of one state of the object with respect to the other state. More particularly this invention relates to apparatus allowing the formation of such holograms by preparing an initial hologram of the object at one state and viewing the object through this first hologram while it undergoes variations in its dimensional state to identify interesting points in its growth curve so that ultimate holograms may then be made through exposures at the interesting point and the base point of the preliminary hologram.

Description of the prior art

The art and science of forming holograms by photographically recording the interference pattern between coherent light provided directly from a source and reflected from an object has undergone intensive development in the past few years. The primary point of interest of such holograms in that after development a truly three-dimensional optical reconstruction of the object may be viewed through the hologram when it is properly illuminated. It has also been determined that when a hologram is formed by a double-exposure wherein the object has undergone slight dimensional changes between the two exposures, the holograms of the object in both positions are effectively recorded on the photographic plate and when the developed hologram is properly illuminated the optical reconstruction of the object visible through the hologram, under proper illumination, appears to contain families of fringe lines which are arrayed in a pattern which is a function of the displacement of the member in one state with respect to the other state. These fringe lines result from the interference between the light refracted by the hologram from the two superimposed images. This double-exposure technique has proved useful to analyze small dimensional changes occurring as a result of vibration, mechanical stress or thermal change in the object. In the case of vibration, the record of the two interfering states may be achieved with a single exposure making use of the time averaging property of the film to record the member at the two extremes of its vibration with a single exposure. See Interferometric Vibration Analysis By Wavefront Reconstruction, Powell & Stetson, Journal of the Optical Society of America, December 1965, page 1593.

One difficulty encountered in the formation of such double-exposure holograms is that the fringe families are not visible until the doubly exposed hologram is properly illuminated and viewed so that the hologram must be formed relatively blindly in the hope of capturing contours associated with an interesting dimensional change. In order to obviate this difficulty it has been suggested that a hologram be formed of the object while it is in one state and the optical reconstruction of the object as viewed through this hologram be superimposed on the object while it is in the second state. Light reflected from the actual object will then interfere with the light forming the optical reconstruction, to reveal fringe families which are not identical to those which would be created by a double-exposure hologram technique, but which are sufficiently related thereto to serve as a useful guide in the formation of doubly exposed holograms.

SUMMARY OF THE PRESENT INVENTION

The present invention relates to apparatus for the formation of double-exposure holograms of objects in two closely related dimensional states employing a method which includes first preparing a hologram of the object in one state, and then superimposing the optical reconstruction of the objects over the actual object in a second state. The method begins with the step of supporting a hologram of the object in its first state in spaced relation to the object and properly illuminating the object so that the optical reconstruction is visible through the hologram at an illumination level which is roughly equivalent to that of the actual object as viewed through the hologram. The hologram is then translated toward or away from the object and rotated about a pair of axes normal to one another and to the axes of translation, employing apparatus formed in accordance with this invention, until the visual reconstruction is coincident with the actual object. The illumination during this arrangement, except for the relative intensity levels of the reference and object beams, is substantially identical to that used to form the initial hologram. When near coincidence between the actual image and the optical reconstruction occurs, fringe families which are a function of the dimensional changes between the object in its original state and its present state will be seen.

A visual examination of the object and its reconstructed image is made through the hologram while the condition, such as stress, vibration, temperature, etc., which causes dimensional changes in the object, is varied so as to produce a progression of fringe families. Those levels of the variable which produce dimensional changes that appear from their fringe families to be worthy of recording may be noted. Next, a final hologram is made of the object with double exposures occurring at the particular noted values and the base level. Alternatively, as each interesting condition is noted a single exposure may be made, and the variable may then be adjusted to the base level wherein the second exposure of the same photographic plate may be made.

If the variable is vibration, a double exposed hologram may be formed by a single exposure made while the object is vibrating, taking advantage of the sinusoidal motion of the member and the time averaging properties of the photographic emulsion. In either event the exposures are made by disposing a photographic plate in immediate abutment to the initial hologram, on the side which faces the object. Other than varying the intensity levels of the object and reference beam, no variation of the physical set-up need be made to make the initial exposure of the hologram. The second exposure on non-vibrating objects may be made by adjusting the controlled variable and either extinguishing the laser or covering the photographic plate while the dimensional changes resulting from the adjustment of the variable occur. After the object is settled down to the new dimensional level, a second exposure is made and the hologram developed.

The novel apparatus which allows the practice of this process consists of a support frame having a retainer for the initial hologram and a retainer for supporting a photographic plate in direct parallel abutment to the initial hologram. The frame is manually adjustable along two mutually perpendicular axes and is rotatable about an axis which is normal to these translational axes. The adjustments are quite fine since they are normally required only to compensate for the displacement of the apparatus from the position in which the initial hologram was formed.

The apparatus may be used for forming a hologram of an object in an initial state by disposal of a photographic plate within the retainer on the support frame which is farthest displaced from the object. After the plate is developed, fixed and dried the resultant hologram may be re-inserted in this same retainer and the illumination re-initiated. It may be necessary to modify the illumination level to a certain extent to accommodate for differences in the exposure and viewing processes. Normally, the reference beam must be slightly attenuated by a filter during the exposure process, relative to its state in the viewing process.

The position of the hologram with respect to the object is then adjusted by rotation and translation of the frame components until the visual reconstruction of the object coincides with the actual object as seen through the hologram. If the object has changed dimensions, as by thermal growth for example, the dimensional change related fringe lines will appear on the image. The ambient condition may then be varied, generating modifications in the fringes.

When an interesting state of the object is observed a photographic plate may be inserted into the retainer in front of the one supporting the initial hologram, without in any way displacing the physical setup. Attenuation of the reference beam may then be made if necessary, and a hologram of the object in the interesting state is made. The laser is then extinguished and the object returned to its base state wherein a second exposure is made of the object. The plate is then developed and upon viewing provides a permanent record of the interesting family of contour lines.

It is therefore seen that the present invention provides a novel apparatus, and a novel method for using such apparatus, which enables the process of forming holograms of an object at two displaced physical states to be greatly simplified, shortened in time, and, accordingly, lowered in cost.

DESCRIPTION OF THE DRAWINGS

Other objects, advantages and applications of the present invention will be made apparent by the following detailed description of a preferred embodiment of the invention. The description makes reference to the accompanying drawings in which:

FIG. 2 is a front view of the plate holder assembly;

FIG. 3 is a top view of the plate holder assembly;

FIG. 4 is a sectional view through the plate holder assembly taken along line 4—4 of FIG. 2;

FIG. 5 is a sectional view through the plate holder assembly taken along line 5—5 of FIG. 4.

DESCRIPTION OF THE PREFERRED EMBODIMENT

Figure 1:
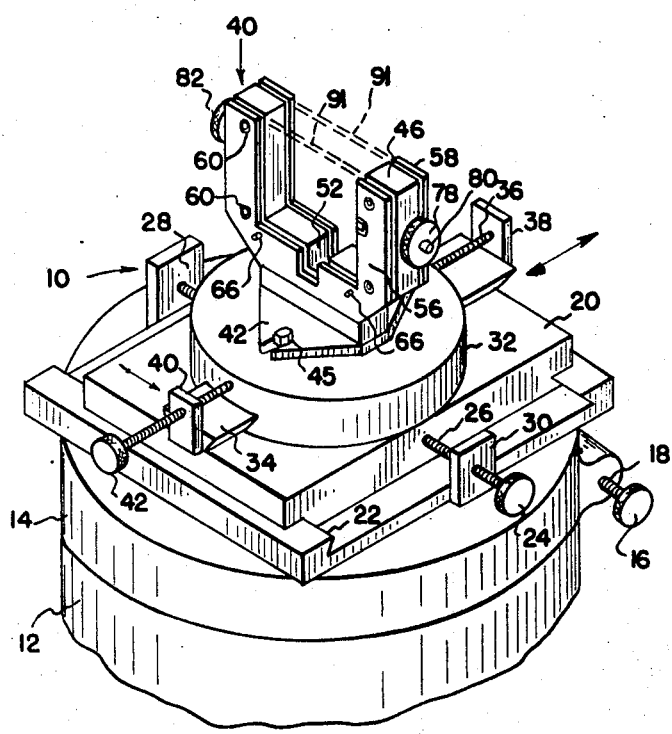
FIG. 1 is a perspective view of a support and adjustment frame forming a first embodiment of the apparatus of the present invention.

Apparatus for supporting photographic plates during the holographic exposure process and for supporting completed halograms during the viewing process, preferably consists of a support frame 10 illustrated in FIG. 1. The unit is mounted on a cylindrical base 12 having a vertically aligned axis. The flat upper side of the base 12 rotatably supports a cylindrical table 14. Appropriate bearing means will be employed to minimize the friction between the table 14 and the base 12 during rotation of the table. The table 14 is rotated with respect to the base 12 by a thumb wheel 16 which drives a screw 18 forming part of an appropriate screw and nut unit (not shown) formed between the base and the table. The drive unit may employ reduction gears to decrease the rotation of the table produced by a given rotation of the thumb wheel 16.

A slide member 20 is supported on top of the table 14 for motion along a first horizontal axis which extends normally to the axis of rotation of the table 14. For purposes of description this will be termed the "X" axis. The slide is retained in a pair of ways 22 and may be moved along the ways by rotating a thumb wheel 24. The wheel is fixed to the end of a screw 26 which is journaled in a pair of end supports 28 and 30. The screw 26 passes through slide 20 and is coupled to it by an appropriate nut mechanism (not shown) so that rotation of the screw in one direction causes the slide 20 to translate along the ways 22 in a first direction, and rotation of the screw 26 in the opposite direction reverses the direction of motion of the slide 20.

An upper slide 32 is supported on top of the slide 20 for motion along a horizontal line which is normal to the X axis and will be termed the "Y" axis. The slide 32, shown as being of cylindrical shape, is supported on top of a way 34 formed on the upper side of the slide 20. A screw 36 is rotatably supported in a pair of end mounts 38 and 40 which project upwardly from the ends of the way 34. A nut mechanism (not shown) within the upper slide 32 causes the upper slide 32 to translate with respect to the lower slide 20 upon rotation of the screw 36. The upper slide 32 may thus be moved in one horizontal direction by rotating thumb wheel 42 and in the normal horizontal direction by rotating the thumb wheel 24 and may be rotated about a vertical axis normal to both of these translation axes by rotating the thumb wheel 16.

A retainer, generally indicated at 40, and disclosed in detail in FIGS. 2–5, is supported on top of the slide 32 by a flat, rectangular base 42. The base has a pair of cutaways 44 at opposed corners and is fixed to the top of the slide 32 by bolts 45 which pass through these cutaways. A generally U-shaped member 46 extends upwardly from the center of the base and includes a pair of arms 48 and 50. The U-shaped member 46 has a central notch 52 formed in its crotch.

A pair of retainer plates 56 and 58, having generally U-shaped configuration, and conforming to the side contour of the U-shaped member 46, are retained on the two opposed sides of the member 46 by four spring loaded pins 60, two of which are disposed in each leg of the U, and which pass through the thickness of the legs, as is best seen in FIG. 4. Each of the pins includes a central spring 62, joining the opposed ends of a pair of headed members. The members pass through holes in the plates 56 and 58 and the heads are disposed on the outside of the plates and urge the plates into abutment with the legs of the U-shaped member 46 under the bias of the spring 62. The plates 56 and 58 may be drawn away from the sides of the U, by hand pressure exerted so as to pull on the springs.

Four aligning pins 66 project outwardly from the sides of the U-shaped member 46, two on each side, and pass through complementary holes in the plates 56 and 58. The pins 66 act to maintain the plates 56 and 58 in positional alignment with the sides of the U-shaped member 46. They also act as stops for positioning film plates, as will be subsequently described.

The plates 56 and 58 may be moved away from the sides of the U-shaped member 46 by a pair of cams 70 and 72, which are disposed within cavities, one formed in each leg of the U. The cam 72 is best seen in FIGS. 4 and 5. It is retained in a cavity 74 which passes fully through the thickness of the leg 50. It is supported on a shaft 76 which is journaled in a hole extending horizontally through the leg, from its ends, and intersects the cavity 74 at right angles. A finger wheel 78 is fixed to the end of the shaft and allows the cam 72, which is fixed to the shaft 76 by a set screw 80, to be rotated. The width of the cam is such that when the long axis of the cam is retained vertically, as shown in FIG. 4, the cam clears the side plates 56 and 58. When the cam is rotated in a clockwise direction as seen in FIG. 4, it makes contact with the plate 58, and moves the end of the plate adjacent to the leg 50 away from the leg. When it is rotated in a counterclockwise direction the cam 72 makes contact with he plate 56 and moves that end of the plate away from the U-shaped member 46.

The cam 70, in the leg 48, is similarly rotatable by a hand wheel 82 which connects to the cam by means of a shaft 84.

The hand wheel 78 and its attached shaft 76 have a central hole formed through them and a small shaft 86 passes through the hole. The outer end of the shaft 86 is threaded to a small knob 88 and the interior end projects beyond the end of the shaft 76 to the opposite side of the leg 50. There it attaches to a cylindrical stop member 90. A spring 92 is positioned around the shaft 86, between the end of the shaft 76 and the opposed side of the cylindrical stop member 90. A pair of horizontaly projecting arms 94 extend from the sides of the cylindrical member 90. By pulling on the wheel 88 the stop arms 94 may be retracted against the bias of the spring 92.

The retainer is adapted to support a pair of photographic plates 91 in the manner indicated by the phantom lines in FIG. 1. The plates 91 have a width approximately equal to the distance between the interior sides of the spring loaded pins 60 which are disposed in the leg 48 and a medium position of the stop arms 94. A plate may be inserted between the plates 58 and the U-shaped member 46 by rotating the hand wheels 78 and 82 in appropriate directions to bring the two cams 70 and 72 into engagement with the plate 58, so as to move it away from the U-shaped member. The photographic plate is then inserted on top of the pins 66 and against the interior sides of the pin 60. This may be done by retracting the hand wheel 88 so as to pull back the stop arms 94. When the wheel 88 is released the stop arms push thep hotographic plate against the interior sides of the pins 60 on the opposite side. The hand wheels 78 and 82 are then rotated so as to release the plate 58 and allow it to return under the pressure of the spring 62 to securely retain the photographic plate. The photographic plate may similarly be placed between the plate 56 and the U-shaped member 48 by rotating the hand wheels 78 and 82 in the opposite direction.

Figure 6:
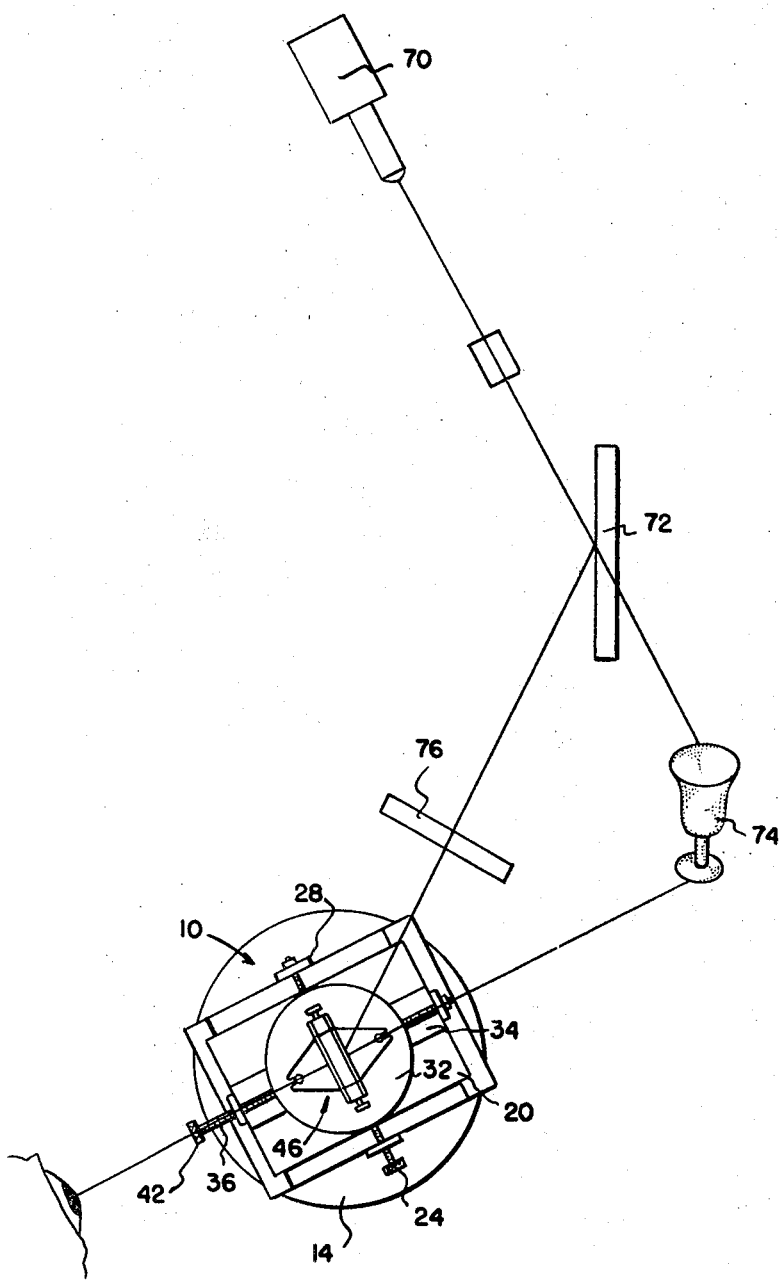
FIG. 6 is a schematic view illustrating the manner in which the apparatus in FIG. 1 is utilized.

The manner in which the support frame is used in the exposure of photographic plates and in the later real time viewing of the object through the developed hologram is illustrated in FIG. 6. A laser 70 is supported so as to project its beam at a beam splitter 72. An object to be subjected to analysis, illustrated as a cup 74, is disposed beyond the beam splitter 72 in such a manner as to receive the direct beam through the splitter. The reflected beam from the splitter passes through an attenuating filter 76 and is directed on the center of the retainer 46. A plate supported in the retainer is thus exposed to both this direct, or reference beam, and the reflected light from the object 74.

The unit is used to initially form a hologram by disposing a photographic plate within the retainer, in the section farthest from the object 74, while the laser 70 is extinguished. When the plate is properly positioned the laser is initiated for sufficient time to properly expose the plate. The laser is then extinguished and the photographic plate is removed for development into a hologram. After the hologram has been formed it is reinserted in the retainer in the rearmost section and the laser is again initiated. The attenuator 76 will normally be removed during this operation to provide the appropriate illumination for viewing the visual reconstruction of the object.

In order to display the real time fringes the hologram must be positioned so that the visual reconstruction exactly coincides with the object as seen through the hologram. This positioning must be performed within a fraction of the wave length of the light being used and deviations which occur in the setup by virtue of such things as the forces required to remove and reinsert the plate or simply thermal changes will disturb this positioning. The coincident positioning of the visual reconstruction on the actual object is re-established by manipulation of the hologram through translation of the slides 20 and 32 and retainer of the setup about its two normal axes. Normally, only very slight translation of the slides will be required to achieve the positioning. The attainment of this positioning will be indicated by the absence of fringe lines on the object as viewed through the hologram.

The object 74 may then be excited so as to vary its dimensions. The manner in which this is done is dependent upon the test being conducted. For example, the member may be heated or caused to vibrate. During this process the object is viewed through the hologram and fringe families will be continually modified as the exciting force is varied. For example, the object 74 may be subjected to vibrations of varying frequency and the fringe families observed to detect the reaction of the object to the vibrating force. When an interesting condition, such as a vibration node, is observed and it is desired to make a permanent record of the vibration pattern and fringe family for further reference and analysis, the laser 60 is first extinguished. A photographic plate is then inserted in the retainer 46 in front of the initial hologram so as to block the hologram from the light. The attenuator 76 is then re-inserted in the setup and the laser is turned on for a sufficient period of time to expose a photographic plate to the interference pattern between the reference and the reflected illumination. The laser is then extinguished and the exciting force is removed so as to return the object to its original state. When certain classes of vibrating forces are utilized on the object it may not be necessary to return it to its original state, but rather a double hologram of the member may be made with a single exposure utilizing the sinusoidal motion of the member and the time averaging properties of the photographic film to record holograms of the member at two positions. Otherwise, after the object has been returned to its initial position, the laser is re-initiated so that a second exposure of the photographic plate is made.

Upon development of the resultant hologram and redisposition in the retainer when the laser light is re-initiated and the attenuator 76 removed, a visual reconstruction of the object 74 will be created, with the fringe families of interest visible thereon. While these families will not exactly duplicate those which are visible when the object is viewed through the initial hologram, they will be indicative of the properties of the object at the interesting state.

It is therefore seen that the support frame 10 may be utilized to simplify and speed the process of forming double-exposure holograms and their use in real time analysis.

The apparatus 10 may be modified to provide greater or fewer degrees of freedom for particular application and to provide greater or lesser accuracy in accordance with the requirements of particular processes. The form illustrated is intended to be exemplary of particular apparatus and the present invention should not be considered to be limited to that apparatus but rather only to the invention as defined in the following claims.

Having thus described my invention, I claim:

1. Apparatus for forming holograms, comprising: a support member including means for retaining a pair of photographic plates in parallel spaced position with respect to one another; and means for translating the support along either of a pair of mutually perpendicular axes both aligned in a plane generally normal to the plane in which the photographic plates are supported, said support member comprising a generally U-shaped member having opposed flat sides, a pair of plates each retained in abutment to one of the sides of the U-shaped member by resilient means, and means for moving either of the plates away from the U-shaped member, whereby a photographic plate may be inserted between either of the plates and the U-shaped member and retained in position by the resilient means.

2. The apparatus of claim 1 wherein the means for moving either of the plates away from the U-shaped member manually operated cams which may be brought into contact with the sides of either of the plates which abut the U-shaped member, so as to exert a force on the plate so contacted so as to move it away from the U-shaped member against the resilient means.

3. The apparatus of claim 1 wherein the support member includes a pair of spaced vertical legs with each leg having a pair of planar parallel vertical surfaces facing in opposite directions, with one of each such surface on one of the legs lying on the same plane as one of the surfaces on the opposite leg; and wherein a pair of plates are retained in abutment, one against each such pair of surfaces by resilient means, and means are provided for moving either of the plates away from its abutting pair of surfaces.

4. The apparatus of claim 3 wherein the means for moving either of the plates away from its abutting pair of surfaces on the two legs consists of a pair of cams, one being rotatably supported in each of the legs, the cams being eccentric with respect to their mounting so that either of them may be disposed in either a central position where it does not contact either of the plates, or in either of a pair of positions where it alternately abuts one or the other of the plates and urges it away from its contacted surfaces.

5. In apparatus of the type for use in holographic interferometry, said apparatus comprising means for illuminating an object with coherent light and adapted to provide a reference beam and an object beam on a photographic plate, the improvement comprising a plate holder having first seating means adapted to receive a first photographic plate in a space occupied by the path of said beams to make a hologram of said object in its reference condition and to receive said hologram in said space for producing an image of the object superposed upon the object while the object is in a different condition from the reference condition which may be predetermined by viewing the interference fringe pattern resulting from the superposed image, said plate holder also having second seating means adapted to receive a second photographic plate in closely spaced parallel face to face alignment with said hologram and located between said hologram and the object, the space between the areas bounded by the first and second seating means providing an unobstructed light path so a plate on one seating means will be exposed to the same light as a plate on the other seating means, whereby a second hologram of the double exposure type may be produced on the second photographic plate representing the surface configuration of the object with the object in said different condition relative to said reference condition and also representing the surface configuration of the object with the object in said reference condition.

6. The invention as defined in claim 5 wherein said plate holder is adjustably mounted upon a support member for angular and translational positioning with respect thereto, said first and second seating means on the plate holder being fixed relative to each other whereby adjustment for positioning the first hologram is effective to position the second seating means so that the second photographic plate is properly positioned thereby to produce the second hologram.

7. The invention as defined in claim 5 wherein said plate holder includes first and second securing means adjacent said first and second seating means respectively and being independently releasable to permit the insertion and removal of a photographic plate from the respective seating means.

References Cited

UNITED STATES PATENTS 1,195,225   8/1916   Huebner _____ 355—76
2,664,781   1/1954   Waller _____ 355—52

JOHN M. HORAN, Primary Examiner

U.S. Cl. X.R.

355—72, 75